Nov. 1, 1955
H. L. LYNCH ET AL
2,722,028
DEBURRING MACHINE
Filed Dec. 17, 1952
4 Sheets-Sheet 1
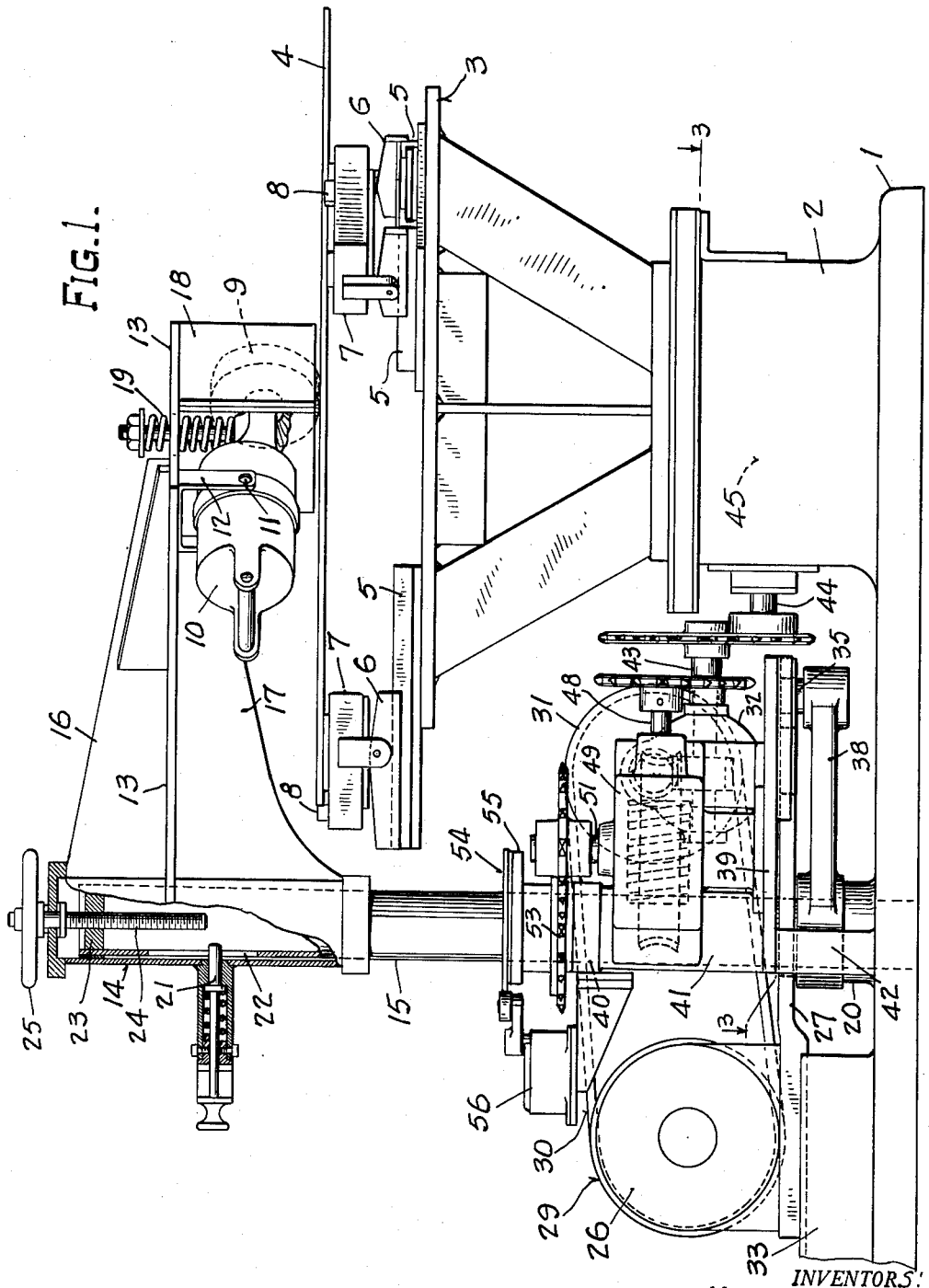
INVENTORS:
Henry L. Lynch
Torsten A. Rybeck
BY
Andrus & Scealer
ATTORNEYS.

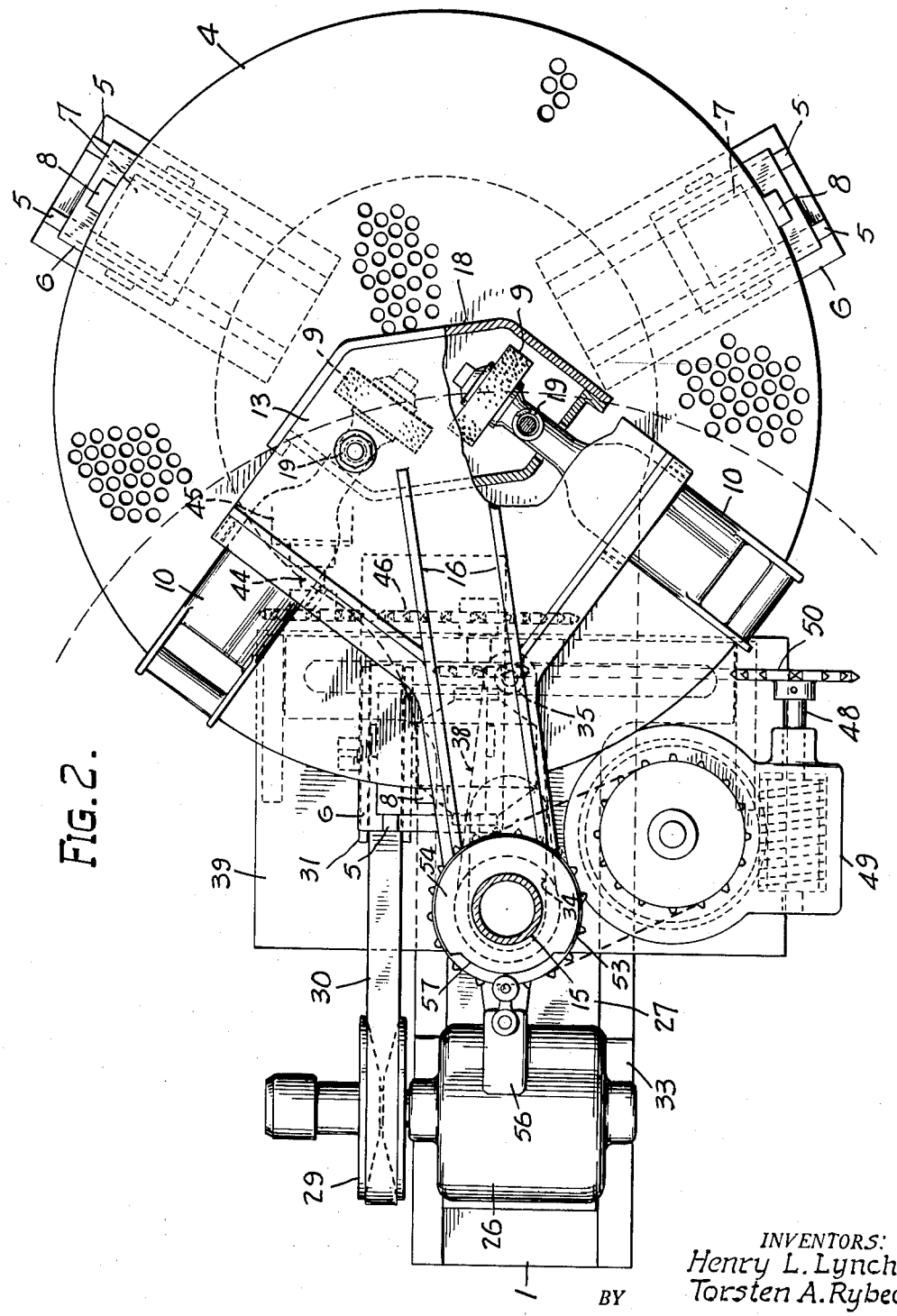

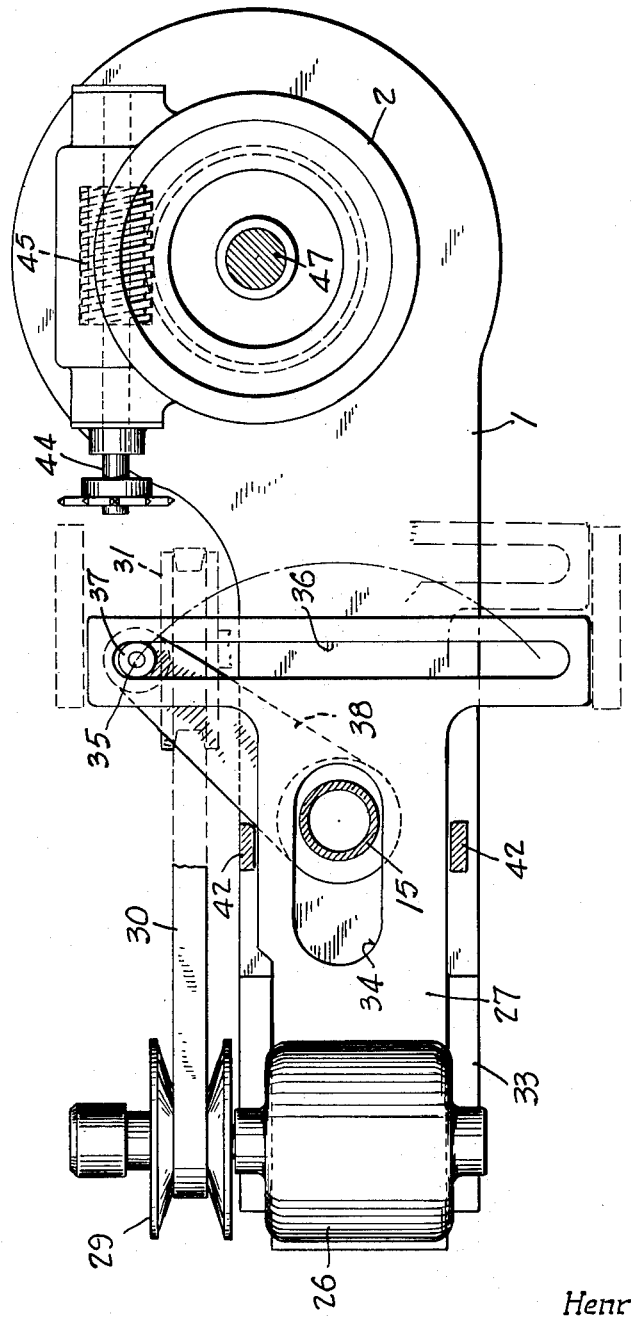

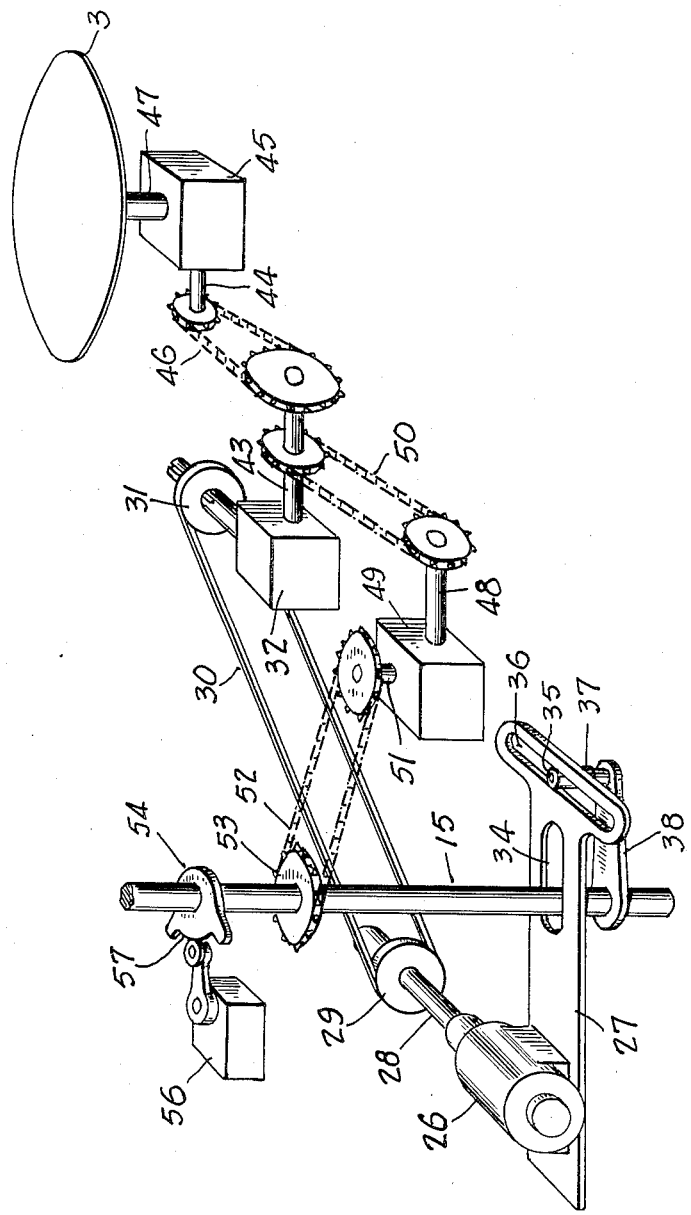

United States Patent Office 2,722,028
Patented Nov. 1, 1955

2,722,028

DEBURRING MACHINE

Henry L. Lynch, Milwaukee, and Torsten A. Rybeck, Pewaukee, Wis., assignors to A. O. Smith Corporation, Milwaukee, Wis., a corporation of New York Application December 17, 1952, Serial No. 326,518

8 Claims. (Cl. 15—21)

This invention relates to an apparatus for use in removing the drilling burr from the peripheral edge of holes in a baffle plate or the like.

An object of the present invention is to provide an apparatus for removing the drilling burr from around the peripheral edge of a multiplicity of holes in a heat exchanger baffle plate which will effectively and rapidly remove the burr without driving the burr downwardly into the hole.

Another object of the invention is to provide an apparatus for removing burrs from holes whereby a smooth radius is formed around the peripheral edge of the deburred hole.

Still another object is to provide an apparatus for removing the burr from the peripheral edge of a plurality of tube holes in a heat exchanger baffle plate whereby the burr is removed from the entire peripheral edge of each of the holes in a single continuous operation.

Another object is to provide a simple and inexpensive apparatus for removing the burr from the edge of tube holes in a baffle plate whereby the apparatus works on each hole for the same length of time regardless of where the hole is located on the baffle plate.

A typical heat exchanger baffle plate may contain from 800 to 1500 tube holes. The baffle plates are drilled in stacks, and drilling burrs are formed on the peripheral edges of the holes in each of the plates in the stack. It is necessary to remove the burrs so that the heat exchanger tubes may be inserted through the holes.

In the past the holes were individually deburred by a deburring bit which was inserted within each of the holes. Not only was this operation extremely tedious and time consuming but the deburring bit in many cases merely pushed the burr downwardly into the hole with the result that the burr had to subsequently be removed by hand filing.

The present invention is directed to an apparatus for rapidly and effectively removing the drilling burr from the peripheral edge of baffle plate holes or the like. The baffle plate to be deburred is disposed concentrically upon a turntable which is adapted to revolve. A pair of motor-driven wire brushes are disposed above the baffle plate and rotate in contact with the upper surface of the plate to remove the burrs from the periphery of the holes. The brushes are set at an angle of about 90° to each other so that the entire peripheral burr will be removed by the action of the two brushes.

In addition to the individual rotation of the brushes, the brushes sweep, in tandem, across the plate in an arcuate path which passes above the center of the baffle plate. One sweep of the brushes across the plate results in both of the brushes working on each hole in the plate, and the 90° relation between brushes results in the entire peripheral edge of each hole being deburred.

The action of the brushes is such that the edge of the holes is worn down and the holes are provided with a smooth rounded edge. The burr is entirely removed and is not thrown into the hole as is the case with the deburring bit. Thus the hole remains clear and smooth-surfaced.

In order to provide that the brushes work on each hole for the same length of time to produce equally deburred holes regardless of where the hole is positioned on the baffle plate, the speed of the turntable and the speed of the arcuate sweep movement of the brushes is varied so that the maximum speed of the sweep motion and the maximum turntable speed will occur when the brushes are over the center of the turntable and the minimum speed will occur when the brushes are over the circumference of the plate at the end positions of the arcuate sweep.

Other objects and advantages of the invention will appear in the course of the following description.

In the drawings:

Figure 1 is a side elevation of the deburring apparatus;

Fig. 2 is a top plan view of the apparatus shown in Figure 1 with some parts broken away;

Fig. 3 is a horizontal section taken along line 3—3 of Fig. 1; and

Fig. 4 is schematic representation of the variable speed drive mechanism employed to operate the turntable and the mast.

Referring to the drawings there is shown an apparatus for removing drilling burrs from the peripheral edges of holes in plate-like articles. The apparatus is particularly adaptable for use with heat exchanger baffle plates or similar articles which contain a multiplicity of small diameter holes.

The apparatus comprises a base 1 having a fixed pedestal 2 mounted thereon which rotatably supports a turntable 3.

Turntable 3 is adapted to carry a baffle plate 4 or other object to be deburred. Baffle plate 4 is removably secured in concentric relation to turntable 3 by three circumferentially spaced magnetic clamps. Each clamp includes a pair of parallel, radially extending rails 5 which are secured to the upper surface of turntable 3. A carriage 6 is adapted to slide radially on each pair of rails 5 and a magnet 7 is pivotally attached to each carriage 6 by suitable lugs. The plate 4 rests on magnets 7 and is firmly held thereby. The pivotal connection between magnet 7 and the respective carriage 6 permits complete surface engagement between magnets 7 and plate 4 in event that the surface contour of plate 4 is concave or otherwise irregular. Frequently the pressure of the hole drilling operation produces a slight concavity in the plate and the pivotal connection will compensate for this distortion and permit the full force of the magnets to act upon plate 4.

Variable diameter baffle plates 4 may be carried on turntable 3 due to the slidable adjustment of carriage 6 on rails 5. The plate 4 is centered on turntable 3 by stops 8 which extend upwardly from the outer portion of magnets 7 and are adapted to bear against the peripheral edge of the plate 4. Magnets 7 supporting plates 4 are adjusted radially until all three stops 8 are in bearing engagement with the peripheral edge of plate 4. When this condition exists, plate 4 will be centered on turntable 3.

A pair of wire brushes 9 rotate in contact with the upper surface of plate 4 and simultaneously sweep across the plate in tandem as the plate revolves with turntable 3. Brushes 9 serve to scrape the drilling burrs from the peripheral edges of the tube holes in plate 4.

Brushes 9 are vertically disposed above plate 4 and are preferably arranged at an angle of about 90° to each other so that they work on different portions of the circumference of each hole and the combined work of the two brushes will effectively remove the burr from the entire circumferential edge of each hole and provide the edge with a smooth rounded contour.

Brushes 9 are adapted to sweep across the face of baffle plate 4 in a path indicated by the dashed line in Fig. 2. It is desirable that the path extend across the center of plate 4 and that at the end positions of the path both of the brushes lie outwardly of the circumference of plate 4 so that each of the brushes will work on every hole in the plate. By inscribing this path the brushes can effectively deburr every hole in the baffle plate 4 in a single pass across the plate.

It is contemplated that a single brush may be employed in place of the pair of brushes 9 if the single brush is given rotary motion about a vertical axis as well as rotary motion about its central axis. The rotary motion about a vertical axis, spinning on edge, would serve to permit the single brush to work on the entire circumferential edge of the holes and provide the entire edge with a smooth rounded contour.

Each of the brushes 9 is operatively connected to, and driven in a rotary manner by, a motor 10. Motors 10 are pivotally supported in trunnions 11 which are suspended from arms 12. Arms 12 extend downwardly from the opposite side edges of a horizontally disposed supporting plate 13. The inner end of plate 13 is secured to an end cap 14 which is seated on the upper extremity of a vertical mast 15.

Added strength and rigidity is provided for the motor supporting structure by a pair of parallel vertical upper ribs 16 which are secured to the upper surface of plate 13 and cap 14 and by a pair of lower vertical ribs 17 which similarly connect the lower surface of plate 13 and cap 14.

As a safety measure, a cage, indicated generally by 18, may be carried by plate 13 for the purpose of enclosing the brushes 9.

The brushes 9 are each maintained in contacting relation with the face of plate 4 by springs 19 which encircle suitable studs and are interposed between the adjustable heads of the studs and the heads of the respective motors 10. Springs 19 tend to bias the heads of motors 10 and the attached brushes 9 downwardly into contact with plate 4 and insure engagement of brushes 9 with the plate in event that the plate is concave or has other surface irregularities. The trunnion attachment of motors 10 to arms 12 permits the motors and brushes 9 to be pivoted downwardly under the force of springs 19.

Mast 15 is generally tubular in shape and is mounted for rotation in a cup-like pedestal 20 on platform 1. Mast 15 is adapted to oscillate in a rotary manner at a very slow speed and this oscillatory motion is transmitted to motors 10 and brushes 9 through the connecting cap 14, plate 13 and arms 12 to drive the motors and brushes in a generally arcuate path across the face of baffle plate 4.

To permit cap 14 to oscillate with mast 15, the cap is locked against rotary motion with respect to the mast by a spring-loaded pin 21. Pin 21 extends through cap 14 and is normally biased inwardly within a slot 22 formed in mast 15 to lock the cap 14 to mast 15. However, manual rotation of cap 14 in relation to mast 15 may be accomplished if desired by pulling pin 21 outwardly against the force of the spring to disengage the pin from slot 22, and the cap may then be independently rotated to manually move the brushes 9 across plate 4.

The structure supporting motors 10 is adapted to be raised or lowered on mast 15 so that the brushes 9 may work on baffle plates 4 of different thicknesses. The upper end of mast 15 is closed by a disc 23, and a stud 24 is threadedly engaged within an axial opening in disc 23. The upper portion of stud 24 is suitably journaled and secured against longitudinal movement within the head plate of cap 14 and the upper extremity of stud 24, which projects outwardly of cap 14, receives a hand wheel 25. Manual rotation of wheel 25 causes threaded engagement between stud 24 and disc 23 with the result that cap 14 and the attached motor supporting structure may be raised or lowered on mast 15 in accordance with the direction of rotation of wheel 25.

It is desirable to have brushes 9 work on each hole in the baffle plate 4 for the same amount of time regardless of the location of the hole on the plate in order to prevent the peripheral edges of the holes from being non-uniformly ground and to prevent the brushes from overworking any particular area on the plate with the resulting formation of grooves or other irregularities on the surface of the plate. Since the brushes, if moved across the plate 4 at constant speed, would work on a given area adjacent the center of the plate for a longer period than a similar area adjacent the periphery of the plate, it is necessary to increase the speed of rotation of the turntable 3 and also the speed of arcuate movement of the brushes as the brushes approach the center of the turntable. Thus the speed of rotation of the turntable and the speed of the arcuate movement of the brushes are at a minimum when the brushes are at the end point of their sweep, at a position over the periphery of the plate, and both speeds tend to increase with maximum speeds being reached as the brushes pass over the center of the turntable and then decrease as the brushes approach the opposite end position of the arcuate sweep. By coordinating and varying the speed of the turntable rotation and the speed of the arcuate movement of the brushes, the brushes are able to work for an equal time period on each hole in the plate and thus uniformly remove the drilling burr from the holes.

The speed of the turntable rotation and the speed of the sweep of the brushes may be varied by any desired means. As shown in the drawings, it is accomplished by mounting a motor 26, which serves to supply the power to drive turntable 3 and mast 15, on the stem portion of a horizontally disposed movable T-plate 27.

The motor shaft 28, as best seen in Fig. 4, drives a variable speed cone pulley 29. Pulley 29 is of a conventional type being formed of two adjoining conical halves, one of which is adapted to separate from the other against the force of a spring as tension in the belt increases causing the apparent diameter of the cone pulley to decrease and thereby resulting in a decrease in the speed of the belt.

As applied to the present apparatus the cone pulley 29 acting through a belt 30 drives a pulley 31 carried by the input shaft of a speed reducer 32.

The T-plate 27 and the attached motor 26 are adapted to move reciprocally, toward and away from baffle plate 4. As T-plate moves rearwardly away from plate 4, the tension on belt 30 is increased causing the spring-loaded half of cone pulley 29 to separate from the fixed half thereof and resulting in a decrease in the speed of pulley 29 on shaft 28. The slowest motor speed will occur when plate 27 is in the rearwardmost position and the brushes 9 are disposed above the periphery of plate 4 at the end point of the arcuate path. The speed of motor shaft 28 will be greatest when T-plate 27 is in the forwardmost position, corresponding to the brushes being at mid-point of their arcuate path or over the center of plate 4.

To permit T-plate 27 to move in a reciprocating manner, the stem portion of the plate is slidably mounted in a guide block 33 which is supported by platform 1.

The central portion of the stem of T-plate 27 is provided with an elongated opening 34 which receives the mast 15. The elongated configuration of the opening permits the plate to move in a horizontal plane relative to the mast.

The T-plate 27 is given sliding reciprocal motion within block 33 by means of a roller 35 which rides in a generally transverse slot 36 formed in the head portion of T-plate 27 as the mast 15 rotates.

Roller 35 is rotatably secured to shaft 37 which is carried by the outer end of an arm 38. Arm 38 is secured to mast 15 and the oscillation of mast 15 causes roller 35 to move in a generally arcuate path.

As roller 35 moves in a fixed arc and is adapted to ride within the straight slot 36, the T-plate 27 is caused to move forwardly and rearwardly as the roller inscribes its arcuate path. As seen in Fig. 2, when the roller is at the central portion of slot 36 the T-plate 27 will be at its forwardmost limit, toward baffle plate 4, and the plate 27 will be at its rearwardmost position, as shown in Fig. 3, when the roller 28 reaches either end point of the slot 36.

The lower portion of mast 15 is suitably journaled within an opening in a horizontally disposed base plate 39 and within a bearing 40 carried by the upper end of a sleeve 41 which encircles mast 15. The lower end of sleeve 41 is secured to the base plate 39 so that plate 39, sleeve 41 and bearing 40 function as an integral part. Base plate 39 is disposed above T-plate 27 and is secured in a fixed relation to base 1 by legs 42.

As seen in Fig. 4 the output shaft 43 of speed reducer 32 is connected to the input shaft 44 of a second speed reducer 45, mounted on base 1 by a chain drive indicated by 46. The turntable 3 is operatively connected to the output shaft 47 of speed reducer 45 so that rotation of shaft 47 will cause a corresponding rotation of the turntable 3.

The mast 15 is also driven from shaft 43. This is accomplished by connecting shaft 43 to the input shaft 48 of a speed reducer 49 mounted on plate 39 by means of a chain drive 50 while the output shaft 51 of speed reducer 49 acting through chain drive 52 drives the mast 15. The sprocket 53 of chain drive 52 is secured to the mast at a position immediately above the bearing 40.

By the present drive system both the turntable and the mast are subjected to the varying speeds of pulley 31, so that the speed of the turntable and the mast will be automatically varied at predetermined intervals during the oscillation of mast 15.

In order to automatically shut off the power to the unit when the brushes 9 reach the end point of their arcuate sweep across plate 4, a cam disc 54 is attached to mast 15 by means of collar 55 which is disposed above and adjacent sprocket 53.

The roller arm of a limit switch 56 is adapted to ride against the peripheral edge of disc 54 as the mast 15 rotates. The peripheral edge of disc 54 is provided with a shallow recess 57 and when the roller arm of switch 56 rides within recess 57 the power to the unit is on. However, as the mast rotates, the roller arm will ride out of recess 57 and actuate the switch 56 to cut off the power to the unit. The recess 57 is located so that the ends thereof coincide with the end points of the arcuate sweep of brushes 9. By this design the power will automatically be cut off after the brushes 9 have swept across the plate 4 and have reached the end points of the arcuate path.

The present invention provides an extremely simple and effective apparatus for removing the drilling burr from the periphery of a multiplicity of holes in a baffle plate or the like. With a single pass across the surface of the baffle plate by the rotating brushes, the holes are completely deburred. This amounts to a tremendous time and labor saving over the conventional deburring method whereby a chamfering bit was individually inserted within each of the many holes to deburr the same. In addition, the present apparatus does not throw the burr down into the hole but grinds the entire burr from the periphery of the hole and produces a smooth rounded peripheral edge which facilitates the insertion of the heat exchanger tubes within the holes.

Various embodiments of the invention may be employed within the scope of the following claims.

I claim:

1. An apparatus for removing drilling burrs from the peripheral edge portion of a multiplicity of holes formed in the face of a generally flat metal article which comprises, a turntable adapted to rotate and carry said article in a concentric relation thereon, drive means to rotate the turntable about the central axis thereof, a pair of abrasive members mounted for rotation above said article and adapted to rotate in contact with the face of said article and remove the burr from the peripheral edge portion of said holes, said members being disposed normally to the face of said article and at an angle of approximately 90° to each other, second drive means to move said members in a plane substantially parallel to the face of said article as said members rotate with both of said members moving from the edge of said article and across the center thereof, and means responsive to the relative positions of said members and said article and controlling said drive means to increase the speed of the turntable rotation and to increase the speed of the movement of said members across the face of said article as the members approach the center of the article during said movement.

2. An apparatus for removing drilling burrs from the peripheral edge portion of a multiplicity of holes formed in a generally flat baffle plate which comprises, a turntable adapted to support the baffle plate in a concentric relation thereon, drive means to rotate said turntable about the central axis thereof, an abrasive member disposed in contacting relation with the surface of said baffle plate and adapted to rotate in contact therewith to scrape the burr from the peripheral edge portion of the holes in said plate, other drive means to move said member in a plane substantially parallel to the surface of said plate as said member rotates, said member moving across said plate from the periphery of the plate to the center thereof, and means responsive to the relative positions of said member and said plate and controlling said drive means to vary the speed of rotation of said turntable and the speed of the movement of said member as the member moves across said plate, with the maximum speed of the turntable rotation and abrasive member movement occurring when said member passes over the center of said plate and the minimum speed of turntable rotation and abrasive member movement occurring when said member is over the periphery of said plate.

3. An apparatus for removing drilling burrs from the periphery of a multiplicity of holes formed in a generally flat plate which comprises, a turntable, drive means to rotate said turntable about the central axis thereof, a plurality of pivotable magnetic clamps secured to the supporting surface of said turntable, means to effect radial movement of said clamps in relation to said turntable, said plate being carried by said clamps and being aligned concentrically with said turntable by radial adjustment of said clamps, a plurality of wire brushes disposed in contacting relation with the outer face of said plate and adapted to rotate in contact therewith to remove the burr from the entire periphery of the holes in said plate, second drive means to move said brushes in a plane substantially parallel to the face of said plate as said brushes rotate with both of said brushes moving from the periphery of said plate and across the center thereof, and means responsive to the relative positions of said brushes and said plate and controlling said drive means to increase the speed of the turntable rotation and to increase the speed of the movement of said brushes across said plate as the brushes approach the center of said plate during said movement.

4. An apparatus for removing drilling burrs from the periphery of a multiplicity of holes formed in the face of a generally flat metal article which comprises, a turntable adapted to rotate and carry said article in a concentric relation thereon, drive means to rotate the turntable, a pair of wire brushes mounted for rotation above said article and adapted to rotate in contact with the face of the article, said brushes being disposed normally to said article and disposed relatively to each other so as to remove the burr from the entire periphery of the holes, means to urge said brushes into contact with the face of said article and maintain engagement between said brushes and said face regardless of irregularities in contour of said face, second drive means to move said brushes in a plane substantially parallel to the face of said article as said brushes rotate with both of said brushes moving from the edge of said article and across the center thereof, and means responsive to the relative positions of said brushes and said article and controlling said drive means to increase the speed of the turntable rotation and to increase the speed of the movement of said brushes across said article as the brushes approach the center of said article during said movement.

5. An apparatus for removing drilling burrs from the periphery of a multiplicity of holes formed in a generally flat baffle plate which comprises, a turntable adapted to support the baffle plate in concentric relation thereon, drive means to rotate said turntable about the central axis thereof, a wire brush disposed in contacting relation with the surface of said baffle plate and adapted to rotate in contact therewith to scrape the burr from the periphery of the holes in said plate, a vertical post supporting said brush, other drive means to rotate said post about the longitudinal axis thereof and move the brush in a generally arcuate path across the face of said plate, said brush moving from a position outwardly of the periphery of said plate over the center of said plate to a second position outwardly of the periphery of said plate, and means responsive to the relative positions of said brush and said plate and controlling said drive means to vary the speed of rotation of said turntable and the speed of rotation of said post as said brush moves across said plate with the maximum speed of rotation of said turntable and the maximum speed of rotation of said post occurring when the brush is over the center of said plate.

6. An apparatus for removing drilling burrs from the periphery of a multiplicity of holes formed in the face of a generally flat article which comprises, a turntable adapted to rotate and serving to carry the article in concentric relation thereon, drive means to rotate said turntable, a pair of wire brushes mounted for rotation above said article and adapted to rotate in contact with the face of said article, said brushes being disposed normally to said article and at an angle to each other to enable said brushes to work on the entire periphery of the holes, a rotatable member supporting said brushes, other drive means to rotate said member and effect a movement of the brushes in tandem in a generally arcuate path across the face of said article, said brushes moving from a position outwardly of the periphery of said article over the center of said article to a second position outwardly of the periphery of said article, and means responsive to the relative positions of said brushes and said article and controlling said drive means to vary the speed of the rotation of said turntable and the speed of rotation of said member as said brushes move across said article with the maximum speed of rotation of said turntable and the maximum speed of rotation of said member occurring when the brushes are over the center of said article and the minimum speed of rotation of said turntable occurring when the brushes are over the periphery of the article.

7. An apparatus for forming the surface of a generally flat article which comprises, a turntable to support the article and adapted to rotate about the central axis thereof, drive means to rotate the turntable, a rotating member disposed in contacting relation with the surface of the article and adapted to rotate in contact therewith to form the same, second drive means to move said member across the surface of said article as the member and the article rotate, said member moving between a position outwardly of the periphery of said article and a position substantially over the center of said article, and means responsive to the relative positions of said member and said article and controlling said drive means to vary the speed of rotation of said turntable and the speed of movement of said member during the movement of said member with the greatest speed of rotation of said turntable and the greatest speed of movement of said member occurring when said member is over the center of the article.

8. An apparatus for grinding the face of a generally flat metal article which comprises, a turntable adapted to rotate about its central axis and serving to support the article, drive means to rotate said turntable, a pair of abrasive members mounted for rotation above said article and adapted to rotate in contact with the face thereof to grind the same, said members being disposed at an angle of approximately 90° to each other, second drive means to move said members in a plane substantially parallel to the face of said article as the article and said members rotate with both of said members moving from the edge of the article and across the center thereof, and means responsive to the relative positions of said members and said article and controlling said drive means to increase the speed of rotation of the turntable during the movement of said members as the members approach the center of said article.

References Cited in the file of this patent

UNITED STATES PATENTS

| 940,988 | Quimby | Nov. 23, 1909 |
| 1,685,613 | Onsrud | Sept. 25, 1928 |
| 2,209,037 | Riegger | July 23, 1940 |
| 2,271,598 | Maurer | Feb. 3, 1942 |
| 2,368,389 | Von Knauf | Jan. 30, 1945 |
| 2,579,337 | Reaser et al. | Dec. 18, 1951 |